United States Patent [19]
Van Ryzin

[11] Patent Number: 5,909,689
[45] Date of Patent: Jun. 1, 1999

[54] AUTOMATIC UPDATE OF FILE VERSIONS FOR FILES SHARED BY SEVERAL COMPUTERS WHICH RECORD IN RESPECTIVE FILE DIRECTORIES TEMPORAL INFORMATION FOR INDICATING WHEN THE FILES HAVE BEEN CREATED

[75] Inventor: John M. Van Ryzin, Madison, N.J.

[73] Assignees: Sony Corporation, Tokyo, Japan; Sony Electronics, Inc., Park Ridge, N.J.

[21] Appl. No.: 08/933,519

[22] Filed: Sep. 18, 1997

[51] Int. Cl.$^6$ .................................................. G06F 17/30
[52] U.S. Cl. .............................. 707/203; 707/1; 707/202; 707/204; 707/10; 395/703
[58] Field of Search .......................... 707/203, 200–204, 707/8–10, 1; 395/703; 345/329, 331

[56] References Cited

U.S. PATENT DOCUMENTS 5,649,200  7/1997  Leblang et al. ......................... 707/203
5,675,802  10/1997 Allen et al. ............................. 707/203
5,765,171  12/1995 Gehani et al. .......................... 707/203
5,778,389  5/1996  Pruett et al. ............................ 707/204

Primary Examiner—Thomas G. Black
Assistant Examiner—Hosain T. Alam
Attorney, Agent, or Firm—Frommer Lawrence & Haug, LLP.; William S. Frommer

[57] ABSTRACT

A computer program/software determines the latest version for one or more data files used by several interconnected computers or workstations, and selectively updates each file version stored in individual directories on the computers or workstations. The program allows sharing of the data files among a group of users working on a large project, for example, by determining, based on the system date/time information obtained from each computer, when a data file was created or last updated in each computer directory. Those data files with the less recent date/time are selectively either replaced or merged with the most recent version of the file via the interconnection structure among the computers. As a result, each computer directory always maintains the most recent version of the data file.

8 Claims, 5 Drawing Sheets

AUTOMATIC UPDATE OF FILE VERSIONS FOR FILES SHARED BY SEVERAL COMPUTERS WHICH RECORD IN RESPECTIVE FILE DIRECTORIES TEMPORAL INFORMATION FOR INDICATING WHEN THE FILES HAVE BEEN CREATED

BACKGROUND OF THE INVENTION

The present invention is related to computer software and, in particular, to apparatus and method for automatically updating file versions for files which are shared by several computer users and which are located in each user individual file directory stored in his/her computer.

A complex software project consisting of thousands of lines of code is typically designed to be modular. That is, the project is divided into multiple portions independent of each other. Not only does it become easier to manage and debug the entire program code, but this also allows several programmers (team members) to work simultaneously by assigning each portion to an individual programmer. At the completion of all individual programming efforts, these portions are then assembled into a main program. The main program invokes each individually prepared source code module (by making subroutine or module calls, for example) to execute the entire project source code.

Each team member's code portion, however, may not be completely independent of the remaining code. That is, common data may need to be shared between different modules. Alternatively, one programmer may use a particular source code which can be fully re-used (without any modifications) by another programmer. It would be wasteful to duplicate efforts of several programmers if data sharing is not supported by the system.

Currently, each team member is responsible for remembering which source files he/she changed and sending the most current (updated) file versions to other team members if they need the files. Often, a team member forgets to send the most current file version, creating a problem that is difficult to detect and fix.

In addition, two team members may want to modify the same source file. When this happens, the team members must compare the differences in the two versions of the same file and incorporate the changes individually made by the two members into one common file. This new common file is then distributed to all of the team members. This is time consuming and prone to human error during the creation of the common file. Alternatively, only one team member may be allowed to work on the file version (that is, the file is "locked" by the user), while changes to the file by the other team members are not saved. This results in one or more programmers being idle for indeterminate amounts of time waiting for the file modifications to be completed, such that the file becomes available ("unlocked") to other team members.

OBJECTS OF THE INVENTION

It is an object of the present invention to overcome the above disadvantages.

It is another object of the present invention to allow a group of computer users to work on the same project individually.

It is yet another object of the present invention to maintain the most current version of data files in each user directory.

It is a further object of the present invention to share data files among a group of computer users individually working on the same project.

SUMMARY OF THE INVENTION

These and other objects, features and advantages are accomplished by apparatus and method for updating a data file among file directories. The file directories are located in corresponding computers which record therein temporal information indicating when the data file has been created; and at least two of the file directories contain two versions of the data file. In accordance with the invention, the respective file versions are accessed in each file directory. The temporal information is then obtained on the respective file versions indicating when each file version has been created. It is then determined which of the respective file versions is a more current file version based on the obtained temporal information. Following this determination, a less current file version is replaced by the more current file version by copying the more current file version from the corresponding file directory and transferring the more current file version to the corresponding directory of the less current file version. The more current file version is thereby maintained in each file directory.

In accordance with one aspect of the present invention, system clock information is obtained from each computer and compared therebetween. The obtained temporal information for each file version is then adjusted prior to replacing the less current file version if there is a difference between the system clocks obtained from various computers.

In accordance with another aspect of the present invention, differences between the less current and more current file versions are determined, the less current and more current file versions are selectively merged for obtaining a newly updated file version, and the less current and more current file versions are replaced in the corresponding file directories by the newly updated file version.

BRIEF DESCRIPTION OF THE DRAWINGS

The above-mentioned as well as additional objects, features and advantages of the present invention will become readily apparent from the following detailed description thereof which is to be read in conjunction with the accompanying drawings, in which.

In all Figures, like reference numerals represent the same or identical components of the present invention.

DETAILED DESCRIPTION OF THE PREFERRED EMBODIMENTS

When several team members are working on a single project, each member is typically assigned a different portion of the project. Often, however, team members need to share data in order to proceed with his/her portion of the project or not to duplicate the efforts of other team members. The present invention provides a so-called collaborator software for sharing data among a number of computers/workstations.

As a general overview, the present invention is defined by a program that examines each team member's project directory. The most current version of each source file is then detected based on date/time of its creation/update. Old versions of the source files in each team member's project directory are selectively either replaced or merged with the corresponding most current file version. The operation of file update may take place via a network, a combination of networks such as the Internet, or using a direct file transfer procedure between the two computers.

The present invention will now be described in detail with reference to the accompanying drawings.

Figure 1:
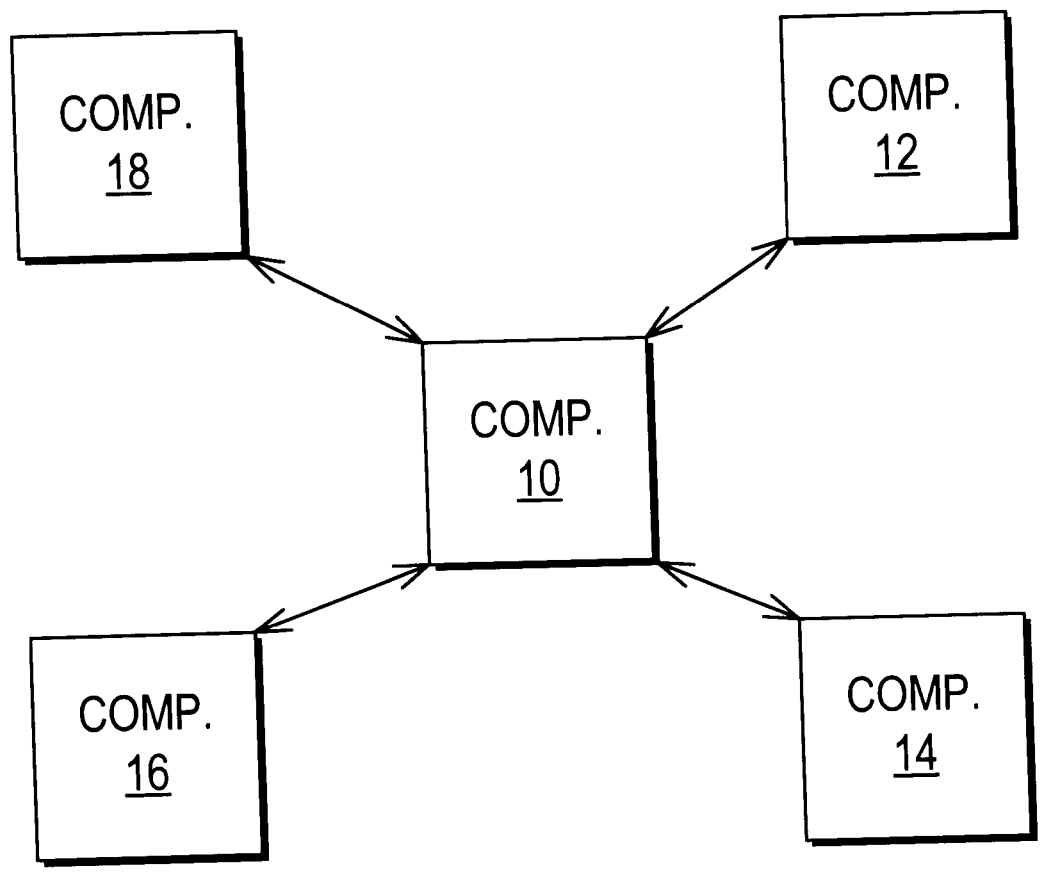
FIG. 1 is a block diagram of interconnected (networked) computers utilizing the present invention.

FIG. 1 shows a block diagram of five interconnected (networked) computers. The network topology is representatively shown as a star configuration, where all communication between computers 12, 14, 16 and 18 is carried out via a computer 10 (a so-called hub). The hub workstation may include a fast-processing server with extra storage space for maintaining a single project directory on a virtual disk (such as J:\OurProjectFiles) accessible by the computers 12, 14, 16, 18. Even though the project directory stored on the computer 10 (the server) may be created for maintaining a project file repository that should be used by all team members, it is not unusual (and in fact very common) for programmers to copy project files from the shared server directory to each individual computer storage, such as a C drive, for example. This practice allows each member to work in his/her own work area (the C drive) independently, and also allows each programmer to compile (assemble, interpret, etc.) the source code and execute the application program on his/her own computer, as opposed to performing these operations on the server which may considerably slow down the server and/or the compilation and execution operations.

The computer 10 (the server) controls the transfer of information between the computers 12, 14, 16 and 18 via any of the network protocols, as known in the art. In accordance with one aspect of the present invention, the inventive program/software resides on the computer 10 and is executed in the following manner with reference to the flowcharts in FIGS. 2A–2D.

Figure 2A:
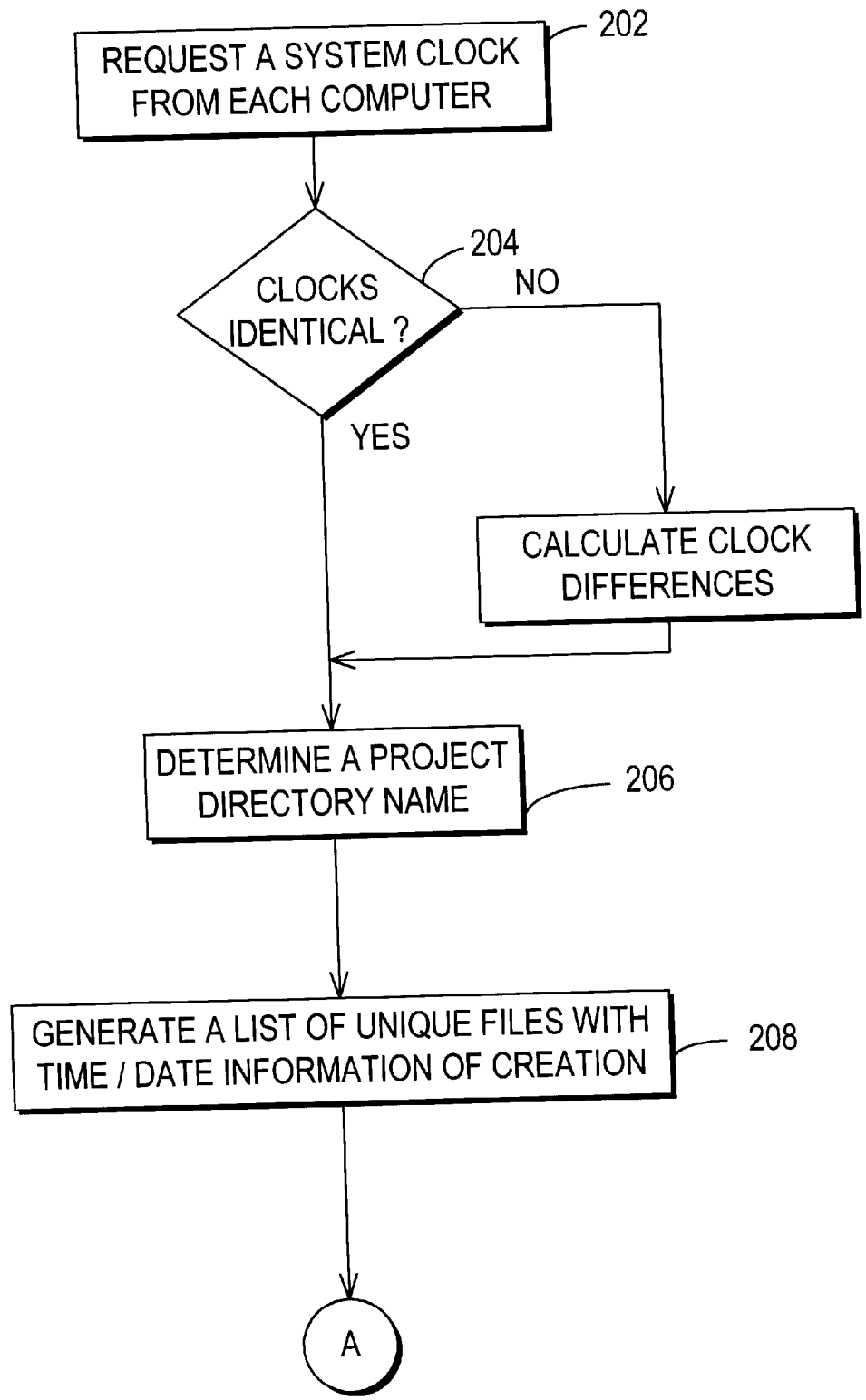
FIGS. 2A–2D are flowcharts detailing sequencing steps which are carried out according to the present invention.

In step 202 of FIG. 2A, the program instructions being executed on the computer 10 are operative to request a system clock from each of the computers 12, 14, 16 and 18. That is, time/date information, as set by an operating system, is collected from each computer. In step 204, it is determined whether the clocks are identical (that is, whether the time/date information is the same for each computer 10, 12, 14, 16, 18). If the system clock values do not contain any differences, then the process continues with step 206, where a project directory name is determined. That is, the executed instructions of the inventive program request the user to enter the project directory name. Alternatively, the project directory name may be searched for automatically, provided, of course, that either all users select the same name or the common project directory name is assigned by default.

If, however, in step 204, the system clocks (date/time information) are not identical, then the clock differences are calculated in correspondence with each computer. The date/time information of the computer 10 (the server) is representatively used as the reference clock, although another reference value may be used as long as the selected reference value is used consistently because only the relative information is required (that is, the differences between the clock values are used by the program, and not their absolute values). If there are differences between system clocks, a notification may be sent to each computer 10, 12, 14, 16, 18 indicating that such differences exist.

In step 208 of FIG. 2A, by executing the program instructions in accordance with the present invention, the computer 10 generates a list of unique files with time/date information indicating when these files were created or last updated, as customarily recorded by the operating system. The generated list is created for each computer 10, 12, 14, 16, 18 (that is, for each common project file directory) containing unique file names (data files) with the corresponding date/time information on their creation/update. For example, the list for the computers 10 and 12 may be as follows, respectively:

Directory name:
C:\OurProjectFiles (Computer 10)
Files:

| | | |
|---|---|---|
| RotateItem | 10:02 a.m. | 08/25/97 |
| MoveItem | 04:37 p.m. | 08/03/97 |
| DeleteItem | 01:54 p.m. | 07/12/96 |
| ZoomItem | 02:45 p.m. | 08/09/97 |

Directory name:
C:\OurProjectFiles (Computer 12)
Files:

| | | |
|---|---|---|
| SelectIcon | 09:02 a.m. | 08/25/97 |
| MoveItem | 03:14 p.m. | 08/05/97 |
| SelectColor | 11:47 a.m. | 08/17/97 |

Figure 2B:
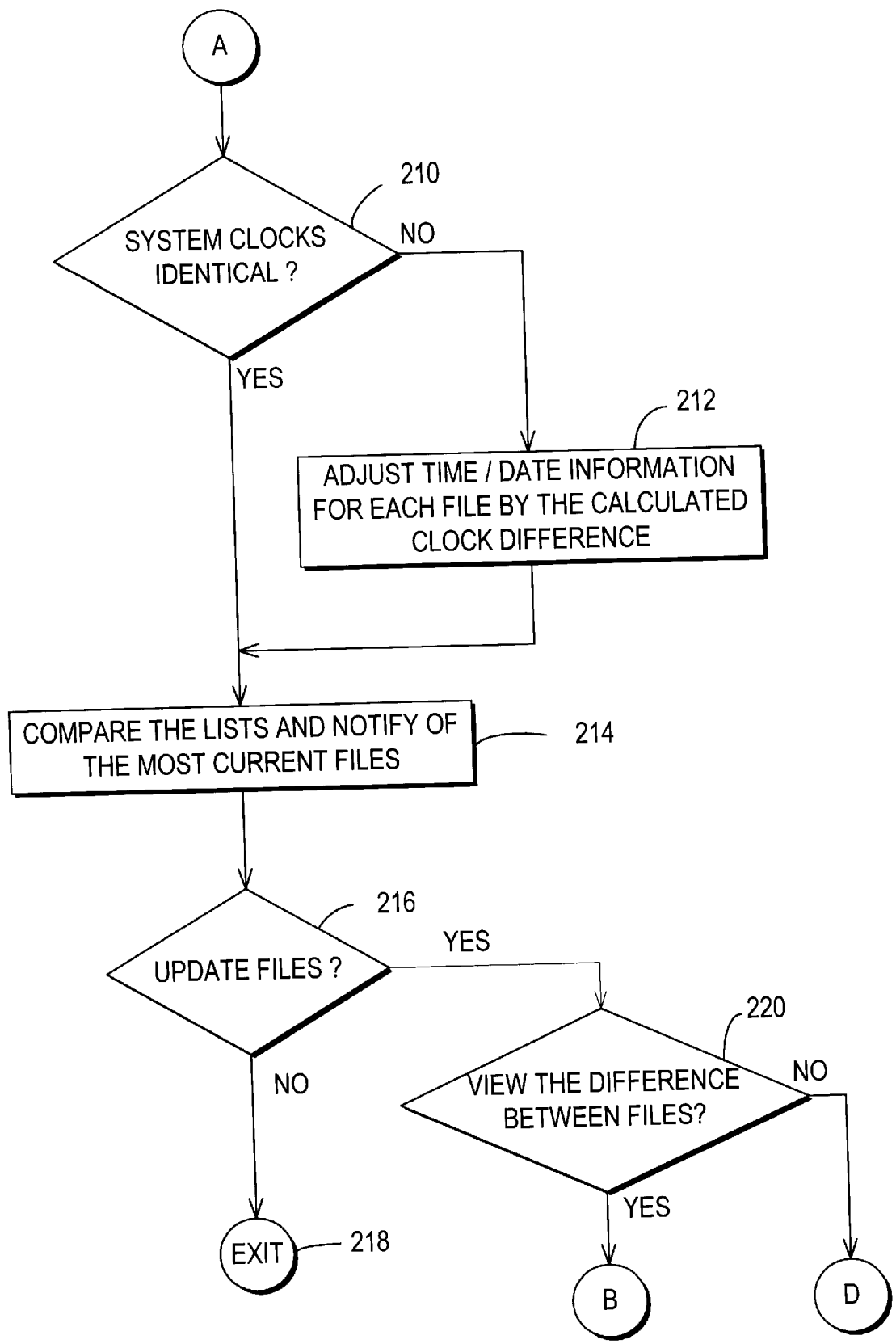

FIG. 2B shows the next steps in the inventive process. In step 210, the previously stored information with reference to the system clocks is accessed to determine whether the adjustments to the file versions have to be made. In particular, the date/time information, obtained in step 204 and stored in the computer 10, is referred to in step 210, and if the computer 10, 12, 14, 16 or 18 has a clock difference associated with it, then the date/time information is adjusted for each file version by the calculated clock difference corresponding to the respective computer. For example, if the computer 12 has the corresponding +1 minute difference (with respect to the reference clock of the computer 10), then the files on its list are adjusted by this time difference. That is, using the above example with respect to the computer 12, the list will be modified as follows:

Directory name:
C:\OurProjectFiles (Computer 12)
Files:

| | | |
|---|---|---|
| SelectIcon | 09:01 a.m. | 08/25/97 |
| MoveItem | 03:13 p.m. | 08/05/97 |
| SelectColor | 11:46 a.m. | 08/17/97 |

As is apparent from the above, the time/date information corresponding to each file was decreased by 1 minute to compensate for the clock difference between the computer 10 (the reference clock) and the computer 12.

Next, step 214 is executed regardless of whether the time/date information had to be adjusted in step 212. Thus, in step 214 of FIG. 2B, the lists of files generated for each computer 10, 12, 14, 16, 18 are compared to determine which files (file versions) are the most recent. In response to the executed instructions of the inventive program, each user (programmer) is then notified of the most current file versions (that is, a notification is sent to each computer 10, 12, 14, 16, 18 for indicating the latest version of each data file).

In step 216, the user (programmer) is given a choice whether he/she desires to update the files in his/her project directory. Occasionally, the programmer wants to experiment or test a new module by using a proven and debugged, albeit older, version of the file. In this situation, the user (programmer) may decline to update his/her directory, and the program exits (the execution of the program instructions by a microprocessor, a programmable controller, or several parallel processors in the computer 10 is properly terminated) in step 218. If, however, the files are to be updated with the latest versions, then step 220 is carried out.

Figure 2C:
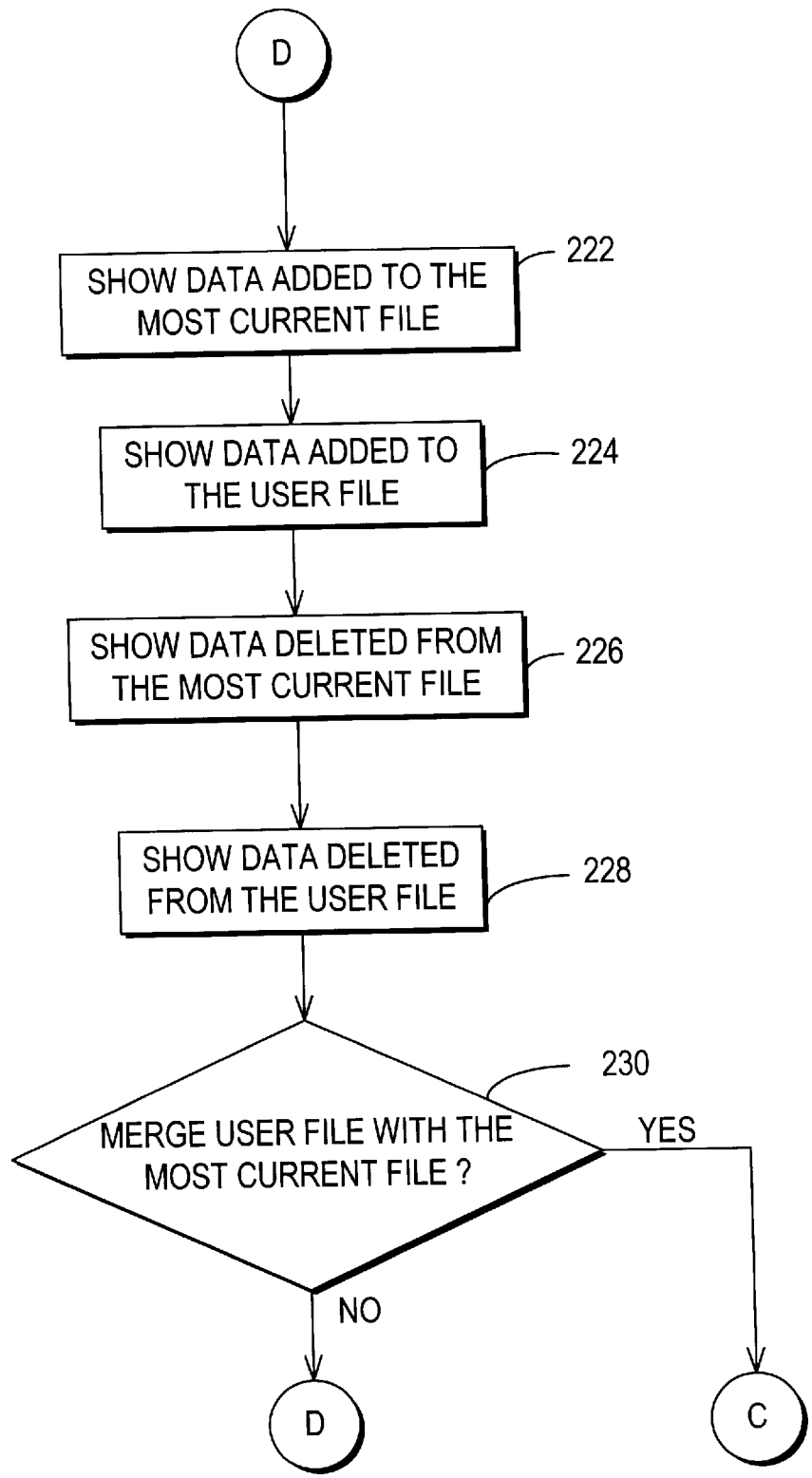
Figure 2D:
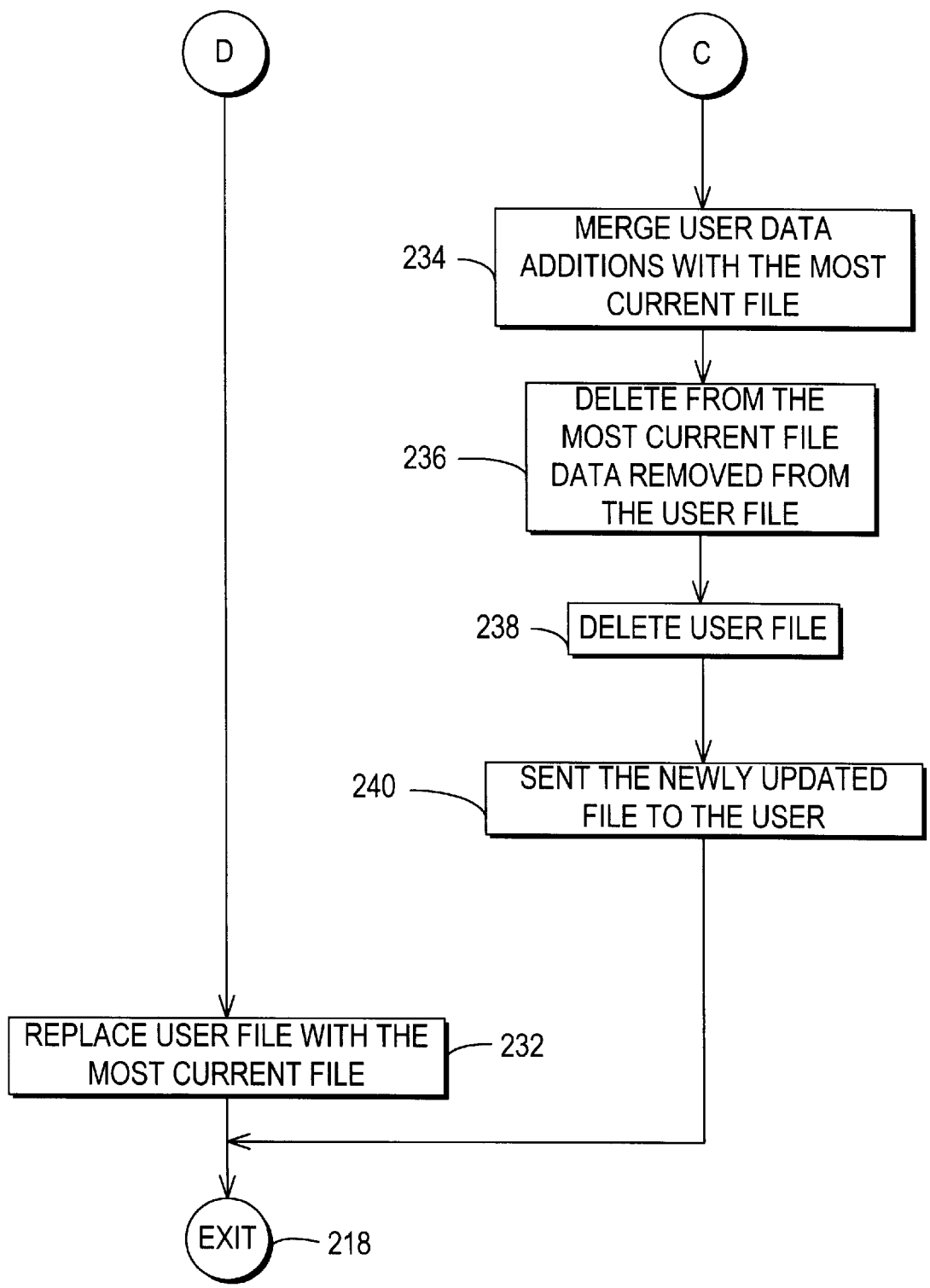

In step 220, it is determined whether the user (programmer) wants to view any differences between the file version in his/her project directory and the most current file version. If the differences (if any) between the two file versions is of secondary consideration, then step 232 in FIG. 2D is carried out. In this step, the older file version in the user project directory is deleted and replaced with the most current file version. This operation is performed by copying the latest file version from a first user project directory and transferring it to a second user project directory in which the older version resides. The older file version is thus overwritten with the latest version obtained from the first user project directory. At the completion of this update operation, the program exits in step 218. If, however, the user (programmer) wants to see the differences between the two file versions, the steps in FIG. 2C are carried out.

In step 222, data that was added to the most current file version, as compared to the user file version, is displayed on a screen. In step 224, under control of the program instructions executed by the computer 10, the screen display shows data that was added to the user file version in comparison with the most current file version. In step 226, data deleted from the most current file version (with respect to the user file version) is viewed on the screen display, and similarly, data deleted from the user file version (with respect to the most current file version) is displayed in step 228. The operations in steps 222, 224, 226 and 228 are carried out to indicate the differences between the two file versions needed to merge the files, as indicated hereinbelow.

In step 230, the user (programmer) is offered an option to combine the two file versions by adding/deleting the differences (that is, merge his/her file version with the latest file version). If the user (programmer) declines to do that, then step 232 is performed, where the user file version is updated with the most current file version, as previously described. On the other hand, if the user (programmer) wants to merge the two file versions, then steps in FIG. 2D are carried out.

In step 234, the user data additions, as previously determined, are added to the latest file version. In step 236, data deleted from the user file is removed from the latest file. Then, the user file is deleted in step 238, and the newly updated file is sent to the user for storage in the user project directory (C:\OurProjectFiles). As a result, the changes in the user file are incorporated into the latest file version. Following this operation, the program exits in step 218.

It will be appreciated that while the above description referred to the merge or replacement of a single file, the above operations are performed on all files in the directory lists generated for the computers 10, 12, 14, 16 and 18. Consequently, all files are selectively updated in each user project directory.

In addition, while the user (programmer) is given an option of whether to update his/her file version as described above with reference to step 216 in FIG. 2B, the file update may take place automatically by overwriting the old file versions with the most current ones in accordance with another aspect of the invention. Similarly, instead of requesting an input from the user on whether to merge the file versions in step 230 of FIG. 2C, this step may be omitted by automatically replacing the old file version with the most current one.

Furthermore, FIG. 1 representatively shows the computers 10, 12, 14, 16 and 18 arranged in the star network configuration, where the computer 10 is the hub for executing the program instructions being operative to perform the operations illustrated in FIGS. 2A–2D. It is understood, of course, that other network topologies, such as ring, tree, bus, etc. employing various communications protocols as known in the art may be used to carry out the present invention. Besides a networking structure, the interconnectivity between computers/workstations may further include direct communication via dial-up modems using an appropriate communications protocol. It is further understood that instead of the computer 10 (the server), one of the interconnected computers or workstations may be selected to execute the program instructions.

It will be also appreciated that although a team of programmers working on a complex software development project was representatively used in the above description, the present invention is not limited thereto and may be used in a variety of situations. For example, a team of writers and editors who are working together on a single project may benefit from the inventive aspects disclosed therein. In this case, the project file directory will contain a number of text files prepared with any of the commercially available word processing packages, where each file may be a chapter in a book prepared by different authors or edited by different editors. Analogous to the team of writers and editors, a group of engineers and/or architects may share Computer Aided Design (CAD) files stored on their workstations; or multimedia software developers may use the present invention to maintain the most current image, animation, sound files in their directories. In contrast to the prior art procedure of exchanging files (relying on each member's manual effort to send updated files to other members) which is prone to human error and is time consuming, in all of the above and other similar situations each member of the project is assured of working with the latest data files without a need to remember to share his/her newest file version with the rest of the group members.

It will be further appreciated that the present invention provides yet another advantage in the field of data backup storage. Hence, by using the invention, there will be no need to backup the data files onto another storage medium (such as a tape), because several complete copies of data files for the entire project exist on team members' computers or workstations at the same time. Hence, each computer's storage medium (such as a hard disk) automatically becomes a backup device without requiring any additional commands or procedures to archive the data files.

In this respect, in software development it is very likely that several months after the completion of the project, some features have to be modified, deleted, added, etc. This operation conventionally involves gathering all of the project files from the team members (who may no longer be with the company) or finding a master backup disk created when the project was completed. In contrast and according to the above aspect of the present invention, each team member has the final version of the data files, significantly simplifying the search for a correct version of the project files to undertake the necessary changes.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A method for updating a data file among a plurality of file directories located in corresponding computers which record in respective file directories temporal information indicating when said data file has been created, at least two of said file directories containing two versions of said data file, said method comprising the steps of:

accessing said respective file versions in said each file directory;

obtaining said temporal information on said respective file versions indicating when said each file version has been created;

obtaining and comparing system clock values from said each computer, and adjusting the obtained temporal information for said each file version if there is a difference between the obtained system clock values;

determining which of said respective file versions is a more current file version based on the obtained temporal information; and replacing a less current file version by said more current file version by copying said more current file version from the corresponding file directory and transferring said more current file version to the corresponding directory of said less current file version, such that said more current file version is maintained in said each file directory.

2. The method according to claim 1, wherein said step of replacing comprises determining differences between said less current and more current file versions, selectively merging said less current and more current file versions for obtaining a newly updated file version, and replacing said less current and more current file versions in the corresponding file directories by said newly updated file version.

3. The method according to claim 1, wherein said computers are interconnected with each other via a network.

4. The method according to claim 1, wherein said network is operative via a dialup modem communication provided between said computers.

5. Apparatus for updating a data file among a plurality of file directories located in corresponding computers which record in respective file directories temporal information indicating when said data file has been created, at least two of said file directories containing two versions of said data file, said apparatus comprising:

means for accessing said respective file versions in said each file directory;

means for obtaining said temporal information on said respective file versions indicating when said each file version has been created;

means for obtaining and comparing system clock values from said each computer;

means for adjusting the obtained temporal information for said each file version if there is a difference between the obtained system clock values;

means for determining which of said respective file versions is a more current file version based on the obtained temporal information; and means for replacing a less current file version by said more current file version by copying said more current file version from the corresponding file directory and transferring said more current file version to the corresponding directory of said less current file version, such that said more current file version is maintained in said each file directory.

6. The apparatus according to claim 5, wherein said means for replacing comprises means for determining differences between said less current and more current file versions, means for selectively merging said less current and more current file versions for obtaining a newly updated file version, and means for replacing said less current and more current file versions in the corresponding file directories by said newly updated file version.

7. The apparatus according to claim 5, wherein said computers are interconnected with each other via a network.

8. The apparatus according to claim 5, wherein said network is operative via a dialup modem communication provided between said computers.

* * * * *